United States Patent
Levy et al.

(10) Patent No.: US 9,413,023 B2
(45) Date of Patent: Aug. 9, 2016

(54) FUSED POWDER OF YTTRIA-STABILISED ZIRCONIA

(75) Inventors: Caroline Levy, Paris (FR); Samuel Marlin, Plan d'orgon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 294 days.

(21) Appl. No.: 13/990,204

(22) PCT Filed: Nov. 29, 2011

(86) PCT No.: PCT/IB2011/055358
§ 371 (c)(1),
(2), (4) Date: Jun. 14, 2013

(87) PCT Pub. No.: WO2012/073187
PCT Pub. Date: Jun. 7, 2012

(65) Prior Publication Data
US 2013/0280638 A1  Oct. 24, 2013

(30) Foreign Application Priority Data
Nov. 29, 2010  (FR) .................................... 10 59836

(51) Int. Cl.
*H01M 8/12* (2016.01)
*C04B 35/484* (2006.01)
(Continued)

(52) U.S. Cl.
CPC ............... *H01M 8/12* (2013.01); *C04B 35/484* (2013.01); *C04B 35/486* (2013.01);
(Continued)

(58) Field of Classification Search
CPC .... H01M 8/12; H01M 4/9066; C04B 35/484; C04B 35/486; C04B 35/4885; C04B 35/6261; C04B 35/65
See application file for complete search history.

(56) References Cited

U.S. PATENT DOCUMENTS 3,993,119 A  11/1976  Scott
4,294,795 A  10/1981  Haga et al.
(Continued)

FOREIGN PATENT DOCUMENTS

EP  0 568 281 A1  11/1993
EP  1 598 892 A1  11/2005
(Continued)

OTHER PUBLICATIONS

Laguna-Bercero et al., "Structured porous Ni—and Co—YSZ cermets fabricated from directionally solidified eutectic composites," *Journal of the European Ceramic Society*, 2005, pp. 1455-1462, vol. 25, Elsevier Ltd.
(Continued)

*Primary Examiner* — Jonathan Jelsma
(74) *Attorney, Agent, or Firm* — Oliff PLC

(57) ABSTRACT

The present invention relates to a powder of molten grains of yttria-stabilized zirconia, said grains having the following chemical analysis, in weight percent on the basis of the oxides:
$ZrO_2+HfO_2$: remainder up to 100%;
$11.8\% \leq Y_2O_3 \leq 18.6\%$;
$0.07\% \leq Al_2O_3 \leq 1.8\%$;
$TiO_2 \leq 0.6\%$, provided that $0.5 < Al_2O_3$
$0.3\% \leq TiO_2$ if $0.6\% < Al_2O_3$;
and other oxides: $\leq 2.0\%$.

14 Claims, 1 Drawing Sheet

(51) Int. Cl.
*C04B 35/486* (2006.01)
*C04B 35/626* (2006.01)
*C04B 35/645* (2006.01)
*H01M 4/90* (2006.01)

(52) U.S. Cl.
CPC ...... *C04B 35/6261* (2013.01); *C04B 35/62665* (2013.01); *C04B 35/645* (2013.01); *H01M 4/9066* (2013.01); *C04B 2235/3217* (2013.01); *C04B 2235/3225* (2013.01); *C04B 2235/3232* (2013.01); *C04B 2235/3418* (2013.01); *C04B 2235/5296* (2013.01); *C04B 2235/5436* (2013.01); *C04B 2235/5481* (2013.01); *C04B 2235/72* (2013.01); *C04B 2235/77* (2013.01); *C04B 2235/96* (2013.01); *H01M 2008/1293* (2013.01); *Y02E 60/50* (2013.01); *Y02E 60/525* (2013.01)

(56) References Cited

U.S. PATENT DOCUMENTS

| | | | | |
|---|---|---|---|---|
| 5,502,012 | A * | 3/1996 | Bert | B02C 17/20 501/103 |
| 2004/0076867 | A1* | 4/2004 | Day et al. | 429/32 |
| 2005/0008915 | A1* | 1/2005 | Kwon | 429/30 |
| 2007/0082254 | A1 | 4/2007 | Hiwatashi | |
| 2008/0213617 | A1* | 9/2008 | Taylor | C23C 4/02 428/603 |
| 2008/0217591 | A1* | 9/2008 | Katusic | C01G 25/006 252/601 |
| 2010/0159356 | A1* | 6/2010 | Mahoney | C04B 35/482 429/495 |

FOREIGN PATENT DOCUMENTS

| | | |
|---|---|---|
| EP | 1 796 191 A1 | 6/2007 |
| WO | WO 2004/093235 A1 | 10/2004 |
| WO | WO 2004/112181 A1 | 12/2004 |

OTHER PUBLICATIONS

Laguna-Bercero et al., "Stability of Channeled Ni—YSZ Cermets Produced from Self-Assembled NiO—YSZ Directionally Solidified Eutectics," *Journal of the American Ceramic Society*, 2005, pp. 3215-3217, vol. 88, No. 11, The American Ceramic Society.

International Search Report issued in International Application No. PCT/IB2011/055358 dated Mar. 23, 2012.

* cited by examiner

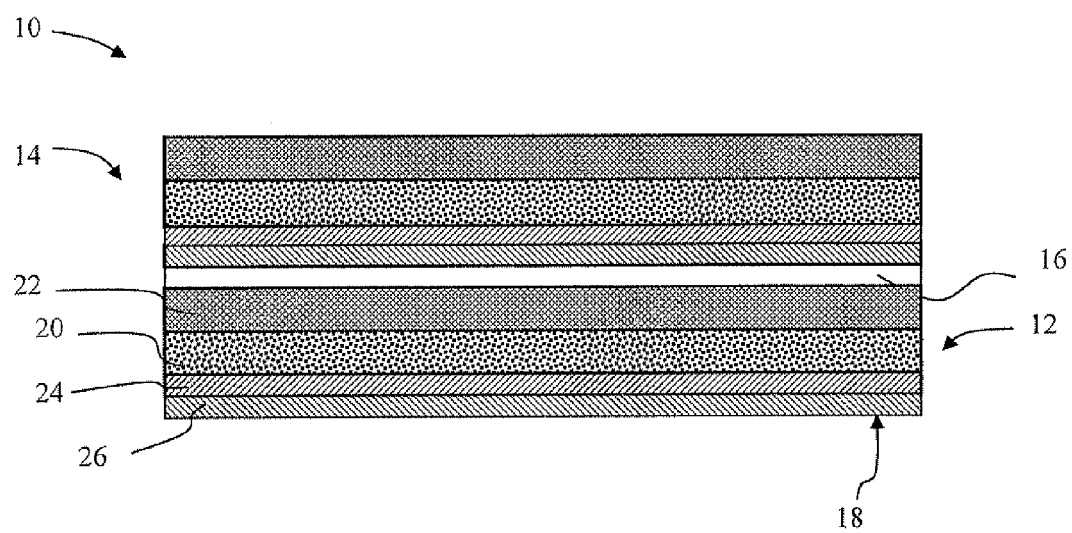

FUSED POWDER OF YTTRIA-STABILISED ZIRCONIA

TECHNICAL FIELD

The present invention relates to a fused powder of yttria-stabilized zirconia, in particular for manufacturing a porous ceramic body exhibiting a good compromise between mechanical strength and open porosity, and in particular an element of a solid oxide fuel cell (SOFC) stack, and especially an anode of such a cell stack.

STATE OF THE ART

An example of a solid oxide fuel cell (SOFC) stack 10, manufactured by a hot pressing process, is represented diagrammatically in cross section in FIG. 1. The cell stack 10 comprises first and second elementary cells 12 and 14 respectively, separated by an interconnector layer 16. As the first and second elementary cells are similar in structure, only the first elementary cell 12 is described. The first elementary cell 12 successively comprises an anode 18, an electrolyte layer 20 and a cathode 22. The anode 18 is composed of an anode functional layer (AFL) 24, in contact with the electrolyte layer 20, and an anode support layer 26. The anode 18 is generally manufactured by a process consisting in depositing an anode functional layer 24 on the anode support layer 26, for example by screen printing. At this stage, the layers 24 and 26 can be based on precursor of the final anode material. A consolidation by sintering is subsequently carried out.

Fuel cell stacks or materials which can be used for the manufacture of fuel cell stacks are described, for example, in WO 2004/093235, EP 1 796 191, US 2007/0082254, EP 1 598 892 or EP 0 568 281.

Porous cermets formed of nickel-oxide yttria-stabilized zirconia (Ni—YSZ) are commonly used to manufacture the anode functional layer.

Processes for the manufacture of cermets by fusion have been studied in particular in the paper "*Structured porous Ni— and Co—YSZ cermets fabricated from directionally solidified eutectic composites*", Journal of the European Ceramic Society, 25 (2005), pages 1455/1462, and in the paper "*Stability of Channeled Ni—YSZ Cermets Produced from Self-assembled NiO—YSZ Directionally Solidified Eutectics*", in J. Am. Ceram. Soc., 88 (2005), pages 3215/3217. The latter paper describes a porous plate made of a Ni—YSZ cermet intended for the manufacture of a solid oxide fuel cell stack anode. This cermet exhibits a regular lamellar eutectic structure, resulting from the use of a laser floating-zone melting method.

WO 2004/112181 describes the use of yttria-stabilized zirconia as electrolyte powder.

Alternatively, the cermets can be manufactured by sintering a mixture of yttria-stabilized zirconia grains and of nickel oxide or cobalt oxide particles, followed by reduction of the nickel oxide to give nickel or of the cobalt oxide to give cobalt. According to two different technologies, the yttria-stabilized zirconia grains can themselves be fused grains or sintered grains.

An anode functional layer has to exhibit:
- a high open porosity, in order to facilitate the catalysis reactions necessary for the electrical performance of the SOFC cell stack;
- a high mechanical strength, in particular for "supported" anodes.

These two properties generally change in opposite directions.

For anode functional layers made of cermet, there thus exists a continual need to optimize the compromise between open porosity and mechanical strength of the cermet, and in particular of the yttria-stabilized zirconia backbone, while retaining electrical conductivity properties suitable for use in an SOFC cell stack.

One aim of the invention is to meet this need.

SUMMARY OF THE INVENTION

According to the invention, this aim is achieved by means of a powder formed of fused grains of yttria-stabilized zirconia, said grains, "grains according to the invention", exhibiting the following chemical analysis, as percentage by weight on the basis of the oxides:

$ZrO_2+HfO_2$: remainder to 100%;
$11.8\% \leq Y_2O_3 \leq 18.6\%$;
$0.07\% \leq Al_2O_3 \leq 1.8\%$;
$TiO_2 \leq 0.6\%$, provided that $0.5 \times Al_2O_3 - 0.3\% \leq TiO_2$ if $0.6\% < Al_2O_3$;
other oxides: $\leq 2.0\%$.

As will be seen in more detail in the continuation of the description, such a powder makes it possible to manufacture, in particular by mixing with metal oxide particles, shaping and then sintering, a sintered body and in particular an anode well suited to SOFC fuel cell stacks.

It is important for the grains according to the invention to be fused. This is because the use of sintered grains, of coprecipitated grains or of fused grains determines the properties of the cermet. For example, $Al_2O_3$ or $Al_2O_3+TiO_2$ are sintering additives conventionally used to improve the sintering of zirconia. However, when they are used to manufacture sintered grains, and are thus incorporated in the latter, they result in reactions with the nickel oxide and/or the nickel during the manufacture of the sintered body. This results in phases harmful to the electrical performance of the SOFC cell stack. However, the inventors have discovered that these additives, incorporated in fused grains, are, on the contrary, a source of improvement in this application.

Generally, it is not possible to determine a priori if properties obtained by the use of sintered or coprecipitated grains will be retained if these grains are replaced by fused grains.

It is also important for the grains according to the invention to comprise a minimum of alumina in order for the product obtained after shaping and sintering of a powder according to the invention to exhibit a good compromise between the open porosity and the biaxial flexure strength.

The grains according to the invention can also comprise one or more of the following optional characteristics:
- preferably, the $Y_2O_3$ content is greater than 12.7%, preferably greater than 13.5%, and/or preferably less than 17.8%, preferably less than 16.9%;
- preferably, the $Al_2O_3$ content is less than 1.7%, preferably less than 1.6%, preferably less than 1.5%, preferably less than 1.4%, preferably less than 1.3%, preferably less than 1.2%, preferably less than 1.1%, preferably less than 1.0%, preferably less than 0.9%, preferably less than 0.8%, preferably less than 0.5%, indeed even less than 0.4%, and/or preferably greater than 0.1%;
- preferably, the $TiO_2$ content is less than 0.4%, preferably less than 0.3%, more preferably less than 0.2%, and/or preferably greater than 0.01%, preferably greater than 0.1% (provided that $0.5 \times Al_2O_3 - 0.3\% \leq TiO_2$ if $0.6\% < Al_2O_3$);
- preferably, the $Al_2O_3$ content is between 0.1% and 0.5% and the $TiO_2$ content is between 0.1% and 0.2%;

preferably, the content of "other oxides" is less than 1.5%, preferably less than 1%, preferably less than 0.7%, preferably less than 0.5%, preferably less than 0.3%, preferably less than 0.2%, indeed even less than 0.1%, the electrical conductivity and catalytic properties being advantageously improved thereby;

preferably, the "other oxides" are impurities;

preferably, the $HfO_2$ content is less than 2.0%, less than 1.8%, less than 1.6%, indeed even less than 1.4%;

preferably, silica is an impurity; preferably, its content is less than 0.5%, preferably less than 0.4%, more preferably less than 0.3%, preferably less than 0.2%, preferably less than 0.1%, indeed even less than 0.05%, the electrical conductivity and catalytic properties being advantageously improved thereby.

In one embodiment, the $Al_2O_3$ content is greater than 0.1%, greater than 0.2%, greater than 0.3%, greater than 0.4%, indeed even greater than 0.5%, greater than 0.6% or greater than 0.7%.

A powder formed of fused grains of yttria-stabilized zirconia according to the invention, "powder according to the invention", can also comprise one or more of the following optional characteristics:

the 90 percentile, $D_{90}$, of the grains of the powder is less than 200 μm, preferably less than 180 μm;

in a first specific embodiment, the powder exhibits:
  a 90 percentile, $D_{90}$, of less than 150 μm, preferably of less than 130 μm, and/or
  a median size $D_{50}$ of between 65 μm and 85 μm, and/or
  a minimum size $D_{10}$ of greater than 30 μm;

in a second specific embodiment, the powder exhibits:
  a 90 percentile, $D_{90}$, of less than 75 μm, preferably of less than 70 μm, and/or
  a median size $D_{50}$ of between 35 μm and 50 μm, and/or
  a minimum size $D_{10}$ of greater than 15 μm, preferably of greater than 20 μm;

in a third specific embodiment, the powder exhibits:
  a 90 percentile, $D_{90}$, of less than 40 μm, preferably of less than 35 μm, and/or
  a median size $D_{50}$ of between 10 μm and 25 μm, and/or
  a minimum size $D_{10}$ of greater than 3 μm, preferably of greater than 5 μm;

in a fourth specific embodiment, the powder exhibits:
  a 90 percentile, $D_{90}$, of less than 15 μm, preferably of less than 10 μm, and/or
  a median size $D_{50}$ of less than 5 μm;

preferably, more than 40%, preferably more than 50%, preferably more than 60%, more preferably more than 70%, of the grains of the powder, as percentages by number, exhibit an aspect ratio R of greater than 1.5, the aspect ratio of the grain being the ratio L/W between the length L and the width W of said grain;

the distribution of the aspect ratio R is such that:
  less than 90%, indeed even less than 80%, of the grains of the powder exhibit an aspect ratio R of greater than 1.5, and/or
  more than 10%, indeed even more than 20%, and/or less than 60%, indeed even less than 40%, of the grains of the powder exhibit an aspect ratio R of greater than 2, and/or
  more than 5%, indeed even more than 10%, and/or less than 40%, indeed even less than 20%, of the grains of the powder exhibit an aspect ratio R of greater than 2.5, and/or
  more than 2%, indeed even more than 5%, and/or less than 20%, indeed even less than 10%, of the grains of the powder exhibit an aspect ratio R of greater than 3, the percentages being percentages by number.

The invention also relates to a process for the manufacture of a powder according to the invention comprising the following successive stages:

a) mixing particulate starting materials contributing $ZrO_2$, $Y_2O_3$, $Al_2O_3$, and optionally $TiO_2$, and/or one or more precursors of these oxides, in order to form an appropriate feedstock so that, on conclusion of stage c), the product exhibits a composition in accordance with that of a grain according to the invention, b) melting the feedstock until a molten material is obtained, c) cooling until said molten material has completely solidified, so as to obtain a fused product, d) optionally, in particular if the fused product is not a powder according to the invention, grinding said fused product.

The invention also relates to a process for the manufacture of a cermet, "cermet according to the invention", comprising the following successive stages:

A) preparing a particulate feedstock comprising a powder according to the invention and particles of nickel oxide or of cobalt oxide and/or one or more precursors of these oxides;

B) shaping the powder prepared in stage A), so as to form a preform;

C) sintering said preform;

D) reducing the nickel oxide to give nickel or the cobalt oxide to give cobalt.

The powder according to the invention used in stage A) can in particular be manufactured according to stages a) to d) described above.

The present invention also relates to a sintered cermet obtained by sintering a feedstock comprising a powder according to the invention.

Preferably, a sintered cermet according to the invention exhibits a total porosity, preferably uniformly distributed, of greater than 20%, preferably of greater than 25%, preferably of greater than 30%, preferably of greater than 35%.

The sintered cermet can in particular be all or part of an electrode, in particular an anode, in particular an anode functional layer. The invention also relates to such an anode and an elementary cell of a solid oxide fuel cell stack comprising an electrode, in particular an anode, according to the invention, and to such a fuel cell stack.

DEFINITIONS

The term "cermet" conventionally refers to a composite material comprising both a ceramic phase and a metal phase. The term "cermet precursor" refers to a material capable, under reducing conditions, of resulting in a cermet according to the invention. A cermet precursor generally comprises a ceramic phase and a phase of a precursor of a metal phase, that is to say capable of being converted into said metal phase under reducing conditions.

A product is conventionally said to be "fused" when it is obtained by a process which employs melting of starting materials and solidification by cooling.

A $ZrO_2$, $Al_2O_3$, $TiO_2$ or $Y_2O_3$ precursor is a compound capable of resulting in the formation of these oxides, by a process which comprises melting, followed by solidification by cooling.

The term "size of a grain" is understood to mean the size of a grain conventionally given by a particle size distribution characterization carried out with a laser particle sizer. The laser particle sizer can, for example, be a Partica LA-950 from Horiba.

The 10 ($D_{10}$), 50 ($D_{50}$) and 90 ($D_{90}$) percentiles or "centiles" are the sizes of grains corresponding to the percentages, by weight, of 10%, 50% and 90% respectively, on the cumulative particle size distribution curve of the sizes of grains of the powder, the sizes of grains being classified by increasing order. For example, 10%, by weight, of the grains of the powder have a size of less than $D_{10}$ and 90% of the grains, by weight, have a size of greater than $D_{10}$. The percentiles can be determined using a particle size distribution produced using a laser particle sizer.

The term "minimum size of a powder" refers to the 10 ($D_{10}$) percentile of said powder.

The term "median size of a powder" refers to the 50 ($D_{50}$) percentile of said powder.

The term "impurities" is understood to mean the inevitable constituents introduced, unintentionally and unavoidably, with the starting materials or which result from reactions with these constituents. The impurities are not necessary constituents but only tolerated constituents. For example, the compounds forming part of the group of the oxides, nitrides, oxynitrides, carbides, oxycarbides, carbonitrides and metal entities of sodium and other alkali metals, iron, vanadium and chromium are impurities if their presence is not desired.

"$ZrO_2$", "zirconium oxide" and "zirconia" are synonymous. When reference is made to "$ZrO_2$", to "zirconium oxide" or to "zirconia", there are good grounds for understanding ($ZrO_2+HfO_2$). This is because a small amount of $HfO_2$, chemically inseparable from $ZrO_2$ and exhibiting similar properties, is always naturally present in zirconia sources at contents generally of less than 2%. In other words, "$ZrO_2+HfO_2$" means $ZrO_2$ and the traces of $HfO_2$ naturally present in zirconia sources.

The terms "Co" and "Ni" are understood to mean cobalt metal and nickel metal.

The term "aspect ratio" R refers to the ratio of the greatest apparent dimension, or "length" L, to the smallest apparent dimension, or "width" W, of a grain. The length and the width of a grain are conventionally measured by the following method. After having withdrawn a representative sample of the grains of the powder, these grains are partially embedded in resin and subjected to a polishing capable of making possible observation as a polished surface. The measurements of the aspect ratio are carried out using images of these polished surfaces, these images being acquired with a Scanning Electron Microscope (SEM), in secondary electrons, with an acceleration voltage of 10 kV and a magnification of ×100 (which represents 1 µm per pixel on the SEM used). These images are preferably acquired in regions where the grains are as well separated as possible, in order to subsequently facilitate the determination of the aspect ratio. The greatest apparent dimension, referred to as length L, and the smallest apparent dimension, referred to as W, are measured on each grain of each image. Preferably, these dimensions are measured using image processing software, such as, for example, Visilog, sold by Noesis. The aspect ratio R=L/W is calculated for each grain. The distribution of the aspect ratio of the powder can subsequently be determined from the combined measurements of aspect ratio R carried out.

Unless otherwise indicated, all the contents of oxides of the grains according to the invention are percentages by weight expressed on the basis of the oxides.

BRIEF DESCRIPTION OF THE FIGURES

Other characteristics and advantages of the invention will become more apparent while reading the description which will follow and on examining the appended drawing, in which FIG. 1 diagrammatically represents, in cross section, a solid oxide fuel cell (SOFC) stack according to the invention.

DETAILED DESCRIPTION OF AN EMBODIMENT OF THE INVENTION

A powder according to the invention can be manufactured according to a general process comprising stages a) to d).

In stage a), the feedstock is adjusted in order for the process to result, on conclusion of stage c) or d), in a powder according to the invention optionally exhibiting one or more of the optional characteristics described above.

Yttrium oxide can be added separately from the zirconium oxide to the feedstock. It is also possible to add, to the feedstock, zirconium oxide doped with yttrium oxide.

In a first specific embodiment, $ZrO_2$, $Y_2O_3$, $Al_2O_3$ and $TiO_2$ are added to the feedstock in the form of $ZrO_2$, $Y_2O_3$, $Al_2O_3$, and $TiO_2$ powders respectively.

In a second specific and advantageous embodiment, use is made of natural zircon $ZrSiO_4$ sand assaying approximately 66% of $ZrO_2$ and 33% of $SiO_2$, the impurities of the zircon conventionally comprising precursors of $Al_2O_3$ and $TiO_2$. The final chemical composition desired can be adjusted by addition of powders formed of $ZrO_2$, $Y_2O_3$, $Al_2O_3$, $TiO_2$ and/or their precursors. In this specific embodiment, melting is carried out under reducing conditions, for example by addition of coke to the feedstock, so as to remove the silica introduced by the zircon. A person skilled in the art knows how to consequently adjust the melting parameters.

The compositions can be adjusted by addition of pure oxides or of mixtures of oxides, in particular $ZrO_2$, $Y_2O_3$, $Al_2O_3$ and $TiO_2$.

According to the invention, a person skilled in the art adjusts the composition of the feedstock so as to obtain, on conclusion of stage c), a product exhibiting the composition of a powder in accordance with the invention. For example, a person skilled in the art knows how to adapt the composition of the feedstock in order to take into account the introduction of small amounts of oxides, such as, for example, $Al_2O_3$ and $TiO_2$.

Although alumina and titanium oxide can be present as impurities in starting materials, it is advisable to select the starting materials in order to ensure that the grains of the powder manufactured systematically exhibit contents of alumina and of titanium oxide in accordance with the invention.

The oxides $ZrO_2$, $Y_2O_3$, $Al_2O_3$, $TiO_2$ and their precursors preferably constitute, with the impurities, more than 90%, more than 95%, more than 99%, preferably 100%, of the weight of the feedstock. Preferably, the impurities are such that, as percentages by weight on the basis of the oxides of the feedstock:

$CeO_2<0.5\%$, preferably the $CeO_2$ content is less than 0.3%, preferably less than 0.1%, and/or $Na_2O<0.3\%$, preferably the $Na_2O$ content is less than 0.2%, preferably less than 0.1%, more preferably less than 0.05%, and/or $Fe_2O_3<0.2\%$, preferably $Fe_2O_3<0.1\%$, and/or $CaO<0.2\%$, preferably the CaO content is less than 0.1%, more preferably less than 0.05%, and/or $MgO<0.2\%$, preferably the MgO content is less than 0.1%, more preferably less than 0.05%.

The impurities can also comprise carbon or manganese oxide.

Use may in particular be made, in stage b), of an induction furnace, a plasma torch, an arc furnace or a laser. Preferably, use is made of an arc furnace or an induction furnace. Advantageously, it is thus possible to obtain large amounts of product in an industrial manner.

In stage b), the melting is preferably carried out under oxidizing conditions, if the feedstock does not comprise zircon sand, or under reducing conditions, if the feedstock comprises zircon sand.

Stage c) can be carried out, completely or partially, under oxidizing conditions or under reducing conditions. Preferably, stage c) is carried out under oxidizing conditions, preferably under air.

In stage d), the fused product resulting from stage c) can be ground. The particle size of the ground product is adjusted according to its destination.

The grinding can be carried out in different types of mills, such as an air jet mill or a roll mill. When a powder exhibiting grains of elongated shape is desired, a roll mill will preferably be used.

If appropriate, the ground grains are subjected to a particle size selection operation, for example by sieving.

The invention also relates to a first specific manufacturing process comprising the stages a) and b) as described above in the context of the general manufacturing process and denoted, for this first process, "$a_1$)" and "$b_1$)" respectively, and a stage c) comprising the following stages:

$c_1'$) dispersion of the molten material in the form of liquid droplets, $c_1''$) solidification of these liquid droplets by contact with a fluid, so as to obtain fused grains.

By simple adjustment of the composition of the feedstock, conventional dispersion processes, in particular blowing, centrifuging or atomization, thus make it possible to manufacture, from a molten material, grains according to the invention, in the form of beads.

A first specific manufacturing process can also comprise one, indeed even several, of the optional characteristics of the general manufacturing process which are listed above.

In one embodiment, the dispersion stage $c_1'$) and the solidification stage $c_1'$) are substantially simultaneous, the means employed for the dispersion bringing about cooling of the molten material. For example, the dispersion can result from blowing gas through the molten material, the temperature of said gas being adjusted to the desired solidification rate.

The invention also relates to a second specific manufacturing process comprising the stages a), b) and d) described above in the context of the general manufacturing process and denoted, for this second specific manufacturing process, "$a_2$)" and "$b_2$)" respectively, and a stage c) comprising the following stages:

$c_2'$) casting said molten material in a mold;

$c_2''$) solidification of the cast material in the mold by cooling until a block is obtained which is at least partially, indeed even completely, solidified;

$c_2'''$) demolding of the block.

This second specific manufacturing process can also comprise one, indeed even several, of the optional characteristics of the general manufacturing process which are listed above.

In a specific embodiment, in stage $c_2'$), use is made of a mold which allows rapid cooling. In particular, it is advantageous to use a mold capable of forming a block in the form of a sheet and preferably a mold as described in U.S. Pat. No. 3,993,119.

The first and second specific processes are industrial processes which make it possible to manufacture large amounts of products, with good yields.

Of course, processes other than those described above might be envisaged in order to manufacture a powder according to the invention.

A powder according to the invention can be used in particular to manufacture a cermet according to the invention, in particular an anode or an anode functional layer, for example by following a process comprising the stages A) to D):

In stage A), the feedstock can comprise between 30% and 70% of nickel oxide NiO or cobalt oxide CoO particles, as percentage by weight of the feedstock, and/or an equivalent amount (i.e. resulting in the same amount of NiO or of CoO) of one or more precursors of these oxides, the remainder preferably being solely a powder according to the invention. The median size $D_{50}$ of the powder of nickel oxide or cobalt oxide particles can be between 0.3 µm and 15 µm, indeed even between 3 µm and 10 µm.

In stage B), the powder can be given any shape, it being possible in particular to be given the shape of a layer.

In stage C), the shaped powder is sintered, according to conventional sintering techniques, preferably by hot pressing.

In stage D), the reduction results in a conversion of at least a portion of the oxides NiO and CoO into Ni and Co respectively. To this end, the preform resulting from stage C) is subjected to a reducing environment. For example, it can be brought into contact with a reducing fluid, such as a hydrogen-comprising gas.

Said reducing fluid preferably comprises at least 4% by volume, preferably at least 20% by volume, indeed even at least 50% by volume, of hydrogen ($H_2$).

In a specific embodiment, stages C) and D) are simultaneous. The sintering is then carried out in a reducing environment.

On conclusion of stage D), a sintered cermet according to the invention is obtained.

The sintered cermet according to the invention can exhibit a high total porosity, typically of greater than 20% and/or of less than 70%.

EXAMPLES

The following nonlimiting examples are given with the aim of illustrating the invention.

A feedstock consisting of particles of zirconia, of yttrium oxide, of alumina and of titanium oxide and/or of precursors of these oxides, as a function of the product to be manufactured, is prepared. They are subsequently melted in an electric arc furnace of Heroult type, so as to obtain the molten material.

The molten material is then poured in the form of a thin stream and then dispersed as beads by blowing with compressed air.

The beads are subsequently ground in a roll mill.

The powder thus obtained is subsequently sieved with application of ultrasound, so as to select the 25-45 µm inter-sieve fraction for the powders of examples 1 to 14 or the undersize from the 25 µm sieve for the powders of examples 15 and 16.

A porous disk with a diameter of 28 mm and a thickness of 2 mm is subsequently manufactured from each of the powders obtained, by cold uniaxial pressing at a pressure of 69 MPa. The disks thus obtained are subjected to hot pressing under air at 1320° C., with a maximum pressure of 7 MPa applied for 30 minutes.

All the properties measured on the porous disks, in particular the biaxial flexure strength, measured according to the standard ASTM C1499, with $D_s$=20 mm, $D_L$=9.5 mm, a rate during the test of 0.508 mm/min and a Poisson's ratio equal to 0.22, and the total porosity, measured by the buoyancy method, are summarized in table 1 below.

This is why, according to the invention, $0.5 \times Al_2O_3 - 0.3\% \leq TiO_2$ if $0.6\% < Al_2O_3$. According to the invention, the alumina content must also be less than or equal to 1.8%.

TABLE 1

|  |  | 1(*) | 2(*) | 3 | 4 | 5 | 6 | 7 | 8 | 9 | 10 | 11(*) | 12(*) | 13(*) | 14(*) | 15(*) | 16 |
|---|---|---|---|---|---|---|---|---|---|---|---|---|---|---|---|---|---|
| Characteristics of the powder | | | | | | | | | | | | | | | | | |
| % $ZrO_2$ + $HfO_2$ | | 83.251 | 83.05 | 83.26 | 83.26 | 82.88 | 82.46 | 82.63 | 82.58 | 82.46 | 82.36 | 82.53 | 82.36 | 82.16 | 81.93 | 83.251 | 82.88 |
| % $Y_2O_3$ | | 16.7 | 16.7 | 16.4 | 16.3 | 16.6 | 17.1 | 16.8 | 16.7 | 16.7 | 16.6 | 16.7 | 16.8 | 16.8 | 16.6 | 16.7 | 16.6 |
| % $Al_2O_3$ | | 0.0055 | 0.026 | 0.13 | 0.26 | 0.32 | 0.38 | 0.47 | 0.48 | 0.64 | 0.7 | 0.68 | 0.78 | 0.9 | 1.26 | 0.0055 | 0.32 |
| % $TiO_2$ | | 0.0015 | 0.18 | 0.16 | 0.13 | 0.13 | 0.002 | 0.025 | 0.1 | 0.14 | 0.25 | 0.024 | 0.002 | 0.056 | 0.15 | 0.0015 | 0.13 |
| % $SiO_2$ | | 0.01 | 0.01 | <0.02 | <0.02 | 0.02 | <0.02 | 0.02 | 0.09 | 0.01 | 0.05 | 0.013 | <0.02 | 0.024 | 0.01 | 0.01 | 0.02 |
| % Impurities | | 0.032 | 0.034 | 0.03 | 0.03 | 0.05 | 0.038 | 0.055 | 0.05 | 0.05 | 0.04 | 0.053 | 0.038 | 0.06 | 0.05 | 0.032 | 0.05 |
| Particle size after sieving (microns) | $D_{90}$ | 69.7 | 67 | 66.9 | 67.1 | 73.8 | 65.7 | 66.9 | 67 | 64.4 | 68.6 | 68.1 | 66.6 | 71.1 | 68 | 31.2 | 25.4 |
| | $D_{50}$ | 44.9 | 42.7 | 42.8 | 43 | 43.2 | 40.4 | 42.3 | 40.4 | 39.9 | 43.1 | 43.6 | 40.3 | 44.6 | 43 | 18.4 | 14.9 |
| | $D_{10}$ | 28.7 | 26.5 | 26.3 | 26.9 | 26.7 | 22.6 | 26.1 | 21.4 | 23.7 | 26.4 | 27.4 | 23.5 | 27.9 | 26.3 | 9.5 | 7.9 |
| Characteristics measured on the porous disks | | | | | | | | | | | | | | | | | |
| Open porosity (%) | | 37 | 37.8 | 38.3 | 39.3 | 37.8 | 38.2 | 38.5 | 38.8 | 38.2 | 39.9 | 38.9 | 36.9 | 38.7 | 37.9 | 35 | 37.6 |
| Biaxial flexure strength (MPa) | | 3.6 | 6.5 | 11.2 | 11 | 10.7 | 8.8 | 8.7 | 9.8 | 8.7 | 8.8 | 6.9 | 8.1 | 6.4 | 7.6 | 16.6 | 17 |

(*)outside the invention

The inventors consider that a good compromise is achieved when, after shaping and sintering a powder corresponding to the 25-45 μm intersieve fraction, obtained by sieving with application of ultrasound:
the open porosity is greater than or equal to 37.5%, preferably greater than 38%, and
the biaxial flexure strength, measured according to the standard ASTM C1499 is greater than or equal to 8 MPa, preferably greater than 9 MPa, indeed even greater than 10 MPa, indeed even greater than 11 MPa.

The examples show that a good compromise is achieved for the products prepared from the powders according to the invention.

Powders of Examples 1 to 14

Corresponding to the 25-45 μm Intersieve Fraction and Obtained by Sieving with Application of Ultrasound The comparison of examples 2 and 3 shows the very positive effect of a slight addition of alumina. However, an alumina content of less than 0.07% does not make it possible to achieve the targeted compromise, even with a $TiO_2$ content of 0.18%.

The comparison of examples 3 to 5 and 9 and 14 (substantially constant titanium content) shows that a very high amount of alumina has a negative effect. In particular, example 14, outside the invention, shows that, for an alumina content of 1.26%, a $TiO_2$ content of greater than 0.15% is necessary in order to achieve the compromise.

The comparison of examples 9 and 11 shows that the negative effect of an excessively high alumina content can be compensated for by an addition of titanium oxide. Examples 12 and 11, outside the invention, show, however, that an alumina content of 0.78% and 0.68% respectively, in combination with a low $TiO_2$ value, does not make it possible to achieve the targeted compromise. The comparison of examples 10 and 11 confirm the need for an addition of titanium oxide if the amount of alumina is high.

Examples 6, 7 and 8 (and in particular a comparison of the last two examples) also illustrate the advantage of an addition of titanium oxide when the alumina content is less than 0.6%. Examples 6 and 7 show in particular that an alumina content equal to 0.38% and 0.47% respectively, in combination with a low $TiO_2$ value, makes it possible to achieve the targeted compromise.

Example 13, outside the invention, shows that, for an alumina content of 0.9%, a $TiO_2$ content of greater than 0.056% is necessary in order to achieve the targeted compromise.

Examples 3 to 5 are the preferred examples.

Powders of Examples 15 and 16

Corresponding to the Undersize from the 25 μm Sieve, Obtained by Sieving with Application of Ultrasound Example 16 shows that the targeted compromise is also achieved for this particle size.

Of course, the present invention is not limited to the embodiments described, which are provided by way of illustration.

The invention claimed is:

1. A powder formed of fused grains of yttria-stabilized zirconia, said grains exhibiting the following chemical analysis, as percentage by weight on the basis of the oxides:
$ZrO_2 + HfO_2$: remainder to 100%;
$11.8\% \leq Y_2O_3 \leq 18.6\%$;
$0.07\% \leq Al_2O_3 \leq 1.8\%$;
$TiO_2 \leq 0.6\%$, provided that $0.5 \times Al_2O_3 - 0.3\% \leq TiO_2$ if $0.6\% < Al_2O_3$;
other oxides:
and said grains having a minimum size $D_{10}$ of greater than 3 μm.

2. The powder formed of fused grains as claimed in claim 1, in which:
the $Y_2O_3$ content is greater than 12.7%, and less than 17.8%; and/or
the $Al_2O_3$ content is less than 1.5%; and/or the TiO$_2$ content is less than 0.4% and greater than 0.01%; and/or the content of "other oxides" is less than 1%.

3. The powder formed of fused grains as claimed in claim 1, in which:

the Y$_2$O$_3$ content is greater than 13.5% and less than 16.9%; and/or the Al$_2$O$_3$ content is less than 0.9%; and/or the TiO$_2$ content is less than 0.3% and greater than 0.1%;

the content of "other oxides" is less than 0.5%.

4. The powder formed of fused grains as claimed in claim 1, in which:

the Al$_2$O$_3$ content is less than 0.5% and greater than 0.1%; and/or the TiO$_2$ content is less than 0.2% and greater than 0.1%; and/or the content of "other oxides" is less than 0.2%.

5. The powder formed of fused grains as claimed in claim 1, in which the 90 percentile, D90, of the grains of the powder is less than 200 μm.

6. The powder formed of fused grains as claimed in claim 1, in which more than 40% of the grains of the powder, as percentage by number, exhibit an aspect ratio R of greater than 1.5, the aspect ratio of the grain being the ratio L/W between the length L and the width W of said grain.

7. The powder formed of fused grains as claimed in claim 6, in which more than 70% of the grains of the powder, as percentage by number, exhibit an aspect ratio R of greater than 1.5.

8. The powder formed of fused grains as claimed in claim 1, wherein a grain exhibiting an aspect ratio R, the aspect ratio of the grain being the ratio L/W between the length L and the width W of said grain, the aspect ratios of the grains of the powder being distributed in a distribution, the distribution of the aspect ratio R being such that:

less than 90% of the grains of the powder exhibit an aspect ratio R of greater than 1.5, and/or more than 10% and less than 60% of the grains of the powder exhibit an aspect ratio R of greater than 2, and/or more than 5% and less than 40% of the grains of the powder exhibit an aspect ratio R of greater than 2.5, and/or more than 2% and less than 20% of the grains of the powder exhibit an aspect ratio R of greater than 3, the percentages being percentages by number.

9. The powder formed of fused grains as claimed in claim 1, wherein a grain exhibiting an aspect ratio R, the aspect ratio of the grain being the ratio L/W between the length L and the width W of said grain, the aspect ratios of the grains of the powder being distributed in a distribution, the distribution of the aspect ratio R being such that:

less than 80% of the grains of the powder exhibit an aspect ratio R of greater than 1.5, and/or more than 20% and less than 40% of the grains of the powder exhibit an aspect ratio R of greater than 2, and/or more than 10% and less than 20% of the grains of the powder exhibit an aspect ratio R of greater than 2.5, and/or more than 5% and less than 10% of the grains of the powder exhibit an aspect ratio R of greater than 3, the percentages being percentages by number.

10. A sintered cermet obtained by sintering a feedstock comprising the powder as claimed in claim 1.

11. An electrode comprising the sintered cermet as claimed in claim 10.

12. A process for the manufacture of the powder as claimed in claim 1, comprising the following successive stages:

a) mixing particulate starting materials contributing ZrO$_2$, Y$_2$O$_3$, Al$_2$O$_3$, and optionally TiO$_2$, and/or one or more precursors of these oxides, in order to form an appropriate feedstock so that, on conclusion of stage c), the product exhibits a composition in accordance with that of the grains of the powder as claimed in claim 1, b) melting the feedstock until a molten material is obtained, c) cooling until said molten material has completely solidified, so as to obtain a fused product, d) optionally, grinding said fused product.

13. A process for the manufacture of a cermet, comprising the following successive stages:

A) preparing a particulate feedstock comprising (i) a powder according to claim 1 and (ii) particles of nickel oxide or of cobalt oxide and/or one or more precursors of these oxides;

B) shaping the particulate feedstock prepared in stage a), so as to form a preform;

C) sintering said preform; and

D) reducing the nickel oxide to give nickel or the cobalt oxide to give cobalt, wherein, in stage a), the feedstock comprises between 30% and 70% of nickel oxide NiO or cobalt oxide CoO particles, as percentage by weight of the feedstock, and/or an equivalent amount of one or more precursors of these oxides.

14. A powder formed of fused grains of yttria-stabilized zirconia, said grains exhibiting the following chemical analysis, as percentage by weight on the basis of the oxides:

ZrO$_2$+HfO$_2$: remainder to 100%;

11.8%≤Y$_2$O$_3$≤18.6%;

0.07%≤Al$_2$O$_3$≤1.8%;

0.01%<TiO$_2$≤0.6%, provided that 0.5×Al$_2$O$_3$−0.3%≤TiO$_2$ if 0.6%<Al$_2$O$_3$;

other oxides: ≤2.0%.

* * * * *